(12) United States Patent
Lee et al.

(10) Patent No.: US 11,589,200 B2
(45) Date of Patent: Feb. 21, 2023

(54) METHOD AND APPARATUS FOR ASSESSMENT OF COMMUNICATION RANGE TO TRANSFER MESSAGES IN TELECOMMUNICATION SYSTEM

(71) Applicant: Samsung Electronics Co., Ltd., Suwon-si (KR)

(72) Inventors: Hoyeon Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 17/447,551

(22) Filed: Sep. 13, 2021

(65) Prior Publication Data

US 2021/0409920 A1    Dec. 30, 2021

Related U.S. Application Data

(63) Continuation of application No. 16/792,759, filed on Feb. 17, 2020, now Pat. No. 11,122,402.

(30) Foreign Application Priority Data

Feb. 15, 2019  (KR) ........................ 10-2019-0018129

(51) Int. Cl.
*H04W 4/50*       (2018.01)
*H04W 4/44*       (2018.01)
(Continued)

(52) U.S. Cl.
CPC .............. *H04W 4/50* (2018.02); *H04L 67/12* (2013.01); *H04W 4/029* (2018.02); *H04W 4/44* (2018.02);
(Continued)

(58) Field of Classification Search
None
See application file for complete search history.

(56) References Cited

U.S. PATENT DOCUMENTS

| 10,327,169 B2 | 6/2019 | Lee et al. |
| 2018/0103460 A1 | 4/2018 | Sharma et al. |

(Continued)

FOREIGN PATENT DOCUMENTS

| KR | 10-2019-0116888 A | 10/2019 |
| WO | 2016/182293 A1 | 11/2016 |

OTHER PUBLICATIONS

"3rd Generation Partnership Project; Technical Specification Group Services and System Aspects; Study on architecture enhancements for EPS and 5G System to support advanced V2X services (Release 16)", 3GPP TR 23.786 V1.1.0 (Jan. 2019), 111 pages.
(Continued)

*Primary Examiner* — German Viana Di Prisco

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
The method includes receiving, by a vehicle to everything (V2X) layer, first information on a V2X service from a V2X application layer and determining, by the V2X layer, range information corresponding to the first information on the V2X service based on a configuration.

14 Claims, 6 Drawing Sheets

(51) Int. Cl.
    *H04W 4/029*     (2018.01)
    *H04W 76/14*     (2018.01)
    *H04L 67/12*     (2022.01)
    *H04W 8/00*      (2009.01)
    *H04W 48/16*     (2009.01)
    *H04W 64/00*     (2009.01)

(52) U.S. Cl.
    CPC ........... *H04W 8/005* (2013.01); *H04W 48/16* (2013.01); *H04W 64/003* (2013.01); *H04W 76/14* (2018.02)

(56) References Cited

U.S. PATENT DOCUMENTS

| | | |
|---|---|---|
| 2018/0249429 A1 | 8/2018 | Zhang et al. |
| 2018/0376304 A1 | 12/2018 | Cheng et al. |
| 2019/0150082 A1 | 5/2019 | Kedalagudde et al. |
| 2019/0230572 A1 | 7/2019 | Cheng et al. |
| 2019/0289459 A1 | 9/2019 | Shan |
| 2019/0313221 A1 | 10/2019 | Lee et al. |
| 2020/0100048 A1 | 3/2020 | Wu et al. |
| 2020/0205209 A1 | 6/2020 | Pan et al. |
| 2021/0014716 A1 | 1/2021 | Zhou et al. |
| 2021/0084542 A1 | 3/2021 | Ahmad et al. |
| 2022/0014973 A1* | 1/2022 | Perras .................... H04W 4/46 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)", 3GPP TS 23.287 70.1.0 (Jan. 2019), 22 pages.

"3rd Generation Partnership Project; Technical Specification Group Services and Systems Aspects; Architecture enhancements for V2X services (Release 15)", 3GPP TS 23.285 V15.2.0 (Dec. 2018), 37 pages.

"3rd Generation Partnership Project; Technical Specification Group Services and Systems Aspects; Service requirements for V2X services; Stage 1 (Release 15)", 3GPP TS 22.185 V15.0.0 (Jun. 2018), 14 pages.

Nokia, Nokia Shanghai Bell, "PPPP and PPPR in SL LCG for eV2X", 3GPP TSG-RAN WG2 Meeting #103, Aug. 20-24, 2018, R2-1812320, 3 pages.

International Search Repori dated May 29, 2020 in connection with International Patent Application No. PCT/KR2020/002218, 3 pages.

Written Opinion of the International Searching Authority dated May 29, 2020 in connection with International Patent Application No. PCT/KR2020/002218, 6 pages.

European Search Report dated Mar. 27, 2020 in connection with European Patent Application No. 20 15 7657, 9 pages.

* cited by examiner

METHOD AND APPARATUS FOR ASSESSMENT OF COMMUNICATION RANGE TO TRANSFER MESSAGES IN TELECOMMUNICATION SYSTEM

CROSS-REFERENCE TO RELATED APPLICATION

This application is a continuation of application Ser. No. 16/792,759, filed Feb. 17, 2020, which is based on and claims priority under 35 U.S.C. 119 to Korean Patent Application No. 10-2019-0018129, filed Feb. 15, 2019, in the Korean Intellectual Property Office, the disclosures of which are herein incorporated by reference in their entirety.

BACKGROUND

1. Field

The disclosure relates to a method of providing a direct communication service between a terminal and a terminal in a telecommunication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Vehicle-to-Everything (V2X), which is a common term indicating all communication types that can be applied to vehicles on the roads, is combined with a wireless communication technology, whereby various additional services other than an initial safety use case become possible.

As a technology of providing V2X services, Wireless Access in Vehicular Environments (WAVE) based on IEEE 802.11p and IEEE P1609 have been standardized. However, WAVE that is a kind of a Dedicated Short Range Communication (DSRC) technology has a limit that the message transmission distance between a vehicle and a vehicle is limited.

A cellular-based V2X technology standard has been progressed in 3GPP to overcome the limit. An LTE-based Evolved Packet System (EPS) V2X standard has been finished in Release 14/Release 15 and an NR-based 5th Generation System (5GS) V2X standard has been progressed in Release 16.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method of providing a direct communication service between a terminal and a terminal in a telecommunication system.

The technical subjects pursued in the disclosure may not be limited to the above mentioned technical subjects, and other technical subjects which are not mentioned may be clearly understood, through the following descriptions, by those skilled in the art of the disclosure.

In accordance with an aspect of the disclosure, a method by a terminal is provided. The method comprises receiving, by a V2X (vehicle to everything) layer, first information on a V2X service from a V2X application layer and determining, by the V2X layer, range information corresponding to the first information on the V2X service based on a configuration.

In accordance with an aspect of the disclosure, a terminal is provided. The terminal comprises a controller configured to control a V2X (vehicle to everything) layer to obtain first information on a V2X service from a V2X application layer, and control the V2X layer to determine range information corresponding to the first information on the V2X service based on a configuration. An embodiment of the disclosure may provide a method of providing a direct communication service between a terminal and a terminal in a telecommunication system.

Effects obtainable from the disclosure may not be limited to the above mentioned effects, and other effects which are not mentioned may be clearly understood, through the following descriptions, by those skilled in the art of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings In describing the disclosure below, a detailed description of related known configurations or functions incorporated herein will be omitted when it is determined that the detailed description thereof may unnecessarily obscure the subject matter of the disclosure The terms which will be described below are terms defined in consideration of the functions in the disclosure, and may be different according to users, intentions of the users, or customs Therefore, the definitions of the terms should be made based on the contents throughout the specification.

Terminologies for discriminating connection nodes, terms indicating network entities, terms indicating message, terms indicating interfaces among network entities, terms, indicating various items of identification information, etc. which are used in the following description are exemplified for the convenience of description. Accordingly, the disclosure is not limited to the terms to be described hereafter and other terms indicating targets having equivalent technological meanings may be used.

Terms and names defined in the standards for a 5G system are used in the disclosure for the convenience of description. However, the disclosure is not limited to the terms and names and may be applied in the same way to systems following other standards.

A communication standard configured by 3GPP will be mainly exemplified in the following detailed description of various embodiments, but the spirit of the disclosure may be applied to other communication systems having similar technical background through slight changes not significantly departing from the scope of the disclosure, which could be determined by those skilled in the art.

An automotive communication system will be mainly exemplified in the following detailed description of various embodiments, but the spirit of the disclosure may be applied to other services provided by a 5G network through slight changes not significantly departing from the scope of the disclosure, which could be determined by those skilled in the art.

Figure 1:
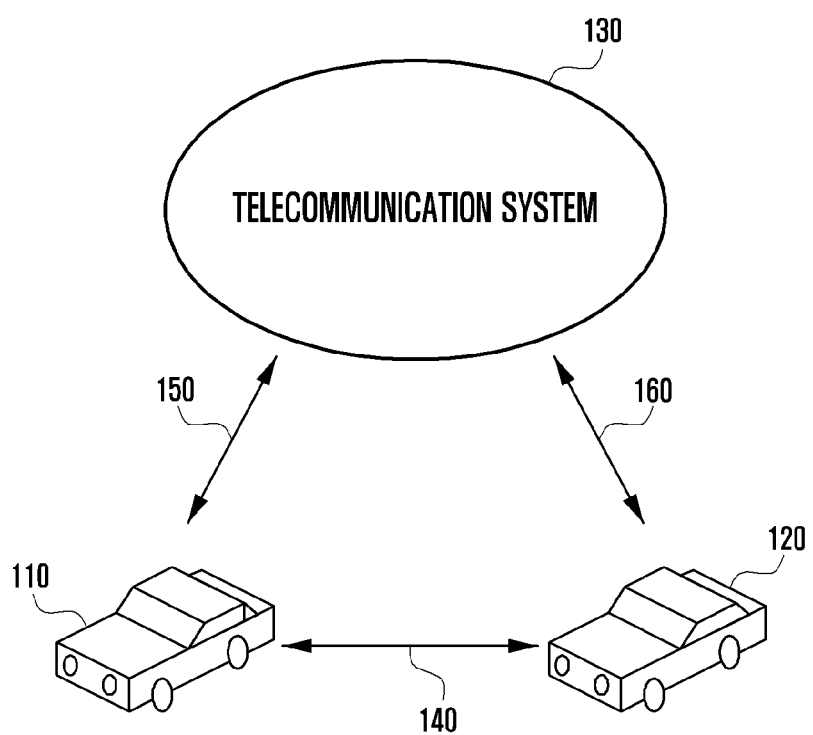
FIG. 1 illustrates a communication configuration diagram between a vehicle and a vehicle according to an embodiment of the disclosure.

FIG. 1 shows the configuration of an automotive communication system according to an embodiment of the disclosure.

Referring to FIG. 1, a vehicle UE 110 may use Device-to-Device communication (D2D, ProSe, PC5, Sidelink communication) 140 or network communication (or Uu link) 150 and 160 through a telecommunication system 130 to communicate with another vehicle UE 120. In the D2D communication, messages may be transmitted/received between the vehicle UE 110 and the vehicle UE 120 through the PC5 link 140. According to the network communication, a message that is transmitted from a transmission vehicle UE 110 to a reception vehicle UE 120 may be transmitted to a network through a Uu link 150 and then may be transmitted to the reception vehicle UE 120 through a Uu link 160.

Figure 2:
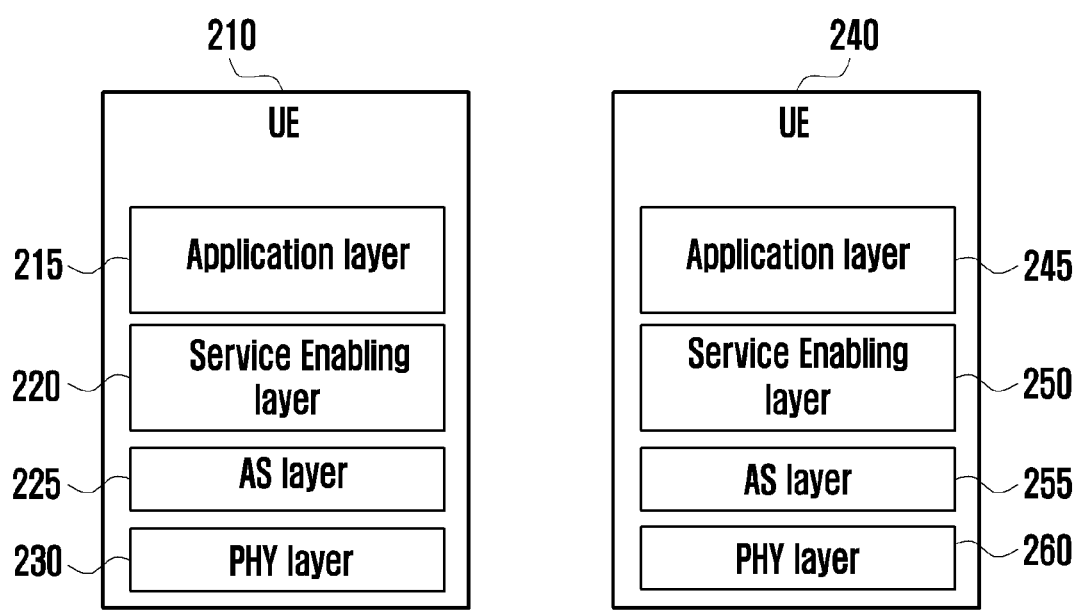
FIG. 2 shows a protocol stack of a terminal according to an embodiment of the disclosure.

FIG. 2 shows a communication protocol stack of a terminal according to an embodiment of the disclosure.

Referring to FIG. 2, UEs 210 and 240 may be configured by application layers 215 and 245, Service Enabling (SE) layers 220 and 250, Access Stratum (AS) layers 225 and 255, and PHYsical (PHY) layers 230 and 260. The SE layer, which is an intermediate layer for performing the operation of the application layer, may provide functions respectively specified for applications or services. One SE layer can support several application layers. Alternatively, SE layers respectively specified for application layers may be defined. For example, the SE layer may be defined as a V2X layer for the operation of a V2X application layer for providing a V2X service.

The application layer 215 of the UE 210 that intends to transmit a message may generate and provide an application message (hereafter, referred to as a 'message') to the SE layer 220. The application layer 215 may provide a 'message type' showing the kind of a message and a 'communication range' showing the transmission range of a message to the SE layer 220 together with the application message. In automotive communication, the message type may be provider service identifier (PSID), intelligent transport systems-application identifier (ITS-AID), etc.

The application layer 215 may determine the communication range for each message using various methods. For example, the application layer 215 may measure distances from surrounding UEs 120 and 240 to which the UEs 110 and 210 intend to transmit a message and may determine communication ranges, using a sensor (e.g., ultrasonic, laser, lidar, camera (image), infrared, natural light, and ultraviolet sensors). Alternatively, the application layer 215 may determine communication ranges by negotiating communication distances from target UEs 120 and 240 to which the UEs 110 and 210 intend to transmit a message. Alternatively, the application layer 215 may determine communication ranges, based on the current locations (e.g., a highway or a city) of the UEs 110 and 210 that intend to transmit a message.

It may be assumed that the distance between the vehicle UE is far from the highway, and the distance between the vehicle UE is close from the city. For example, the application layer 215 may configure a long communication range when a vehicle UE is moving on a highway. The application layer 215 may configure a short communication range when a vehicle UE is moving in a city. Alternatively, the application layer 215 may determine communication ranges, based on the current speeds (e.g., 15 km/h or 100 km/h) of the UEs 110 and 210 that intend to transmit a message. The application layer 215 may configure the communication range long when the speed is expected to be fast on average. For example, the application layer 215 may configure a long communication range when a vehicle UE is moving at a high speed. The application layer 215 may configure a short communication range when a vehicle UE is moving at a low speed. Alternatively, the application layer 215 may determine a communication range in accordance with the message type of a message intended to be transmitted. For example, the application layer 215 may configure a long communication range when a signal message is transmitted through emergency light due to sudden stop. The application layer 215 may configure a short communication range when a signal message is transmitted through a left turn-signal or a right turn-signal.

The communication range that is provided from the application layer 215 to the SE layer 220 may be a unit of distance (meters, kilometers) or an index value that indicates a unit of distance.

The SE layer 220 receiving a message, a message type, and a communication range from the application layer 215 may perform an operation for transmitting a message. The following [Table 1] shows an example of communication range values that is managed by the SE layer 220.

TABLE 1

Examples of Communication Range Value

| Value | Description | Range |
|---|---|---|
| 0 | Reserved | N/A |
| 1 | The communication range is set to: Short. | ~399 m |
| 2 | The communication range is set to: Medium. | 400 m~799 m |
| 3 | The communication range is set to: Long. | 800 m~ |
| 4-255 | Reserved | N/A |

The mapping of values (e.g., 0, 1, 2, 3, etc.) shown in [Table 1], the description of the values (e.g., 1 means 'short', 2 means 'medium', 3 means 'long', etc.), and the ranges that the values show (e.g., 1 is a distance under 399 m, 2 is a distance between 400 m and 799 m, and 3 is a distance over 800 m) is an example for describing an embodiment of the disclosure, and the communication range may be changed and applied in various ways for example as being smaller or larger than the three steps described herein.

When a communication range received from the application layer 215 is a unit of distance, the SE layer 220 may convert the transmitted unit of distance into a communication range value using information in [Table 1]. For example, when the communication range obtained from the application layer 215 is 200 m, it corresponds to the range under 400 m, so the SE layer 220 configures the value as 1. The SE layer 220 may deliver a message and a message type received from the application layer 215 and a communication range value (e.g., 1) configured by the SE layer to the AS layer 225.

When a communication range obtained from the application layer 215 is an index value, the SE layer 220 may use the communication range itself received from the application layer 215 without an additional operation for converting the value. For example, when the communication range received from the application layer 215 is 1, the SE layer 220 may transmit the message and the message communication range value (e.g., 1) received from the application layer 215 to the AS layer 225.

The SE layer 220 may manage information of communication range values respectively for message types. The following [Table 2], [Table 3], and [Table 4] show examples of communication range values respectively for message types that the SE layer 220 manages. [Table 2] shows an example of mapping of communication range values respectively for message types.

TABLE 2

Example-1 of Communication Range
Values respectively for Message Types

| Message type (e.g. PSID or ITS-AID) | Value |
|---|---|
| PSID 1 | 1 |
| PSID 2 | 2 |
| ITS-AID 1 | 2 |
| ITS-AID 2 | 3 |
| Matching all | 1 |

[Table 3] shows an example of mapping of the description of communication range values respectively for message types.

TABLE 3

Example-2 of Communication Range
Values respectively for Message Types

| Message type (e.g. PSID or ITS-AID) | Description |
|---|---|
| PSID 1 | Short |
| PSID 2 | Medium |
| ITS-AID 1 | Medium |
| ITS-AID 2 | Long |
| Matching all | Short |

[Table 4] shows an example of mapping of the ranges of communication range values respectively for message types.

TABLE 4

Example-3 of Communication Range
Values respectively for Message Types

| Message type (e.g. PSID or ITS-AID) | Range |
|---|---|
| PSID 1 | 50 m |
| PSID 2 | 450 m |
| ITS-AID 1 | 700 m |
| ITS-AID 2 | 1000 m |
| Matching all | 200 m |

The SE layer 220 may store and manage one or more of the mapping method shown in [Table 2], the mapping method shown in [Table 3], and the mapping method shown in [Table 4].

The SE layer 220 may determine a communication range value using the mapping information in [Table 2], [Table 3], or [Table 4] in accordance with the message type received from the application layer 215. For example, when the message type received from the application layer 215 is PSID 2, it is possible to configure a communication range value as 2 using [Table 2]. Alternatively, it is possible to change the communication range value to 'Medium' using [Table 3] and configure, as 2, the communication range value corresponding to 'Medium' using [Table 1]. Alternatively, it is possible to change the communication range value to 450 m using [Table 4] and configure, as 2, the communication range value corresponding to 450 m using [Table 1].

The SE layer 220 may transmit a message and a message type received from the application layer 215 and a communication range value (e.g., 2) configured by the SE layer to the AS layer 225.

The information of the communication range values respectively for message types that the SE layer 20 manages may have different communication range values for the same message types, depending on the areas. The following [Table 5], [Table 6], and [Table 7] show examples of communication range values respectively for message types that the SE layer 220 manages and areas to which the communication range values are applied. Only one message type (e.g., PSID 1) is shown for description of the disclosure and other message types may have similar types of mapping values. [Table 5] shows an example of mapping of communication range values respectively for message types and areas to which the communication range values are applied.

TABLE 5

Example-4 of Communication Range
Values respectively for Message Types

| Message type (e.g. PSID or ITS-AID) | Value | Location |
|---|---|---|
| PSID 1 | 1 | Location 1 |
|  | 2 | Location 2 |
|  | 2 | Location 3 |

[Table 6] shows an example of mapping of the description of communication range values respectively for message types and areas to which the description of the communication range values is applied.

TABLE 6

Example-5 of Communication Range
Values respectively for Message Types

| Message type (e.g. PSID or ITS-AID) | Description | Location |
|---|---|---|
| PSID 1 | Short | Location 1 |
|  | Medium | Location 2 |
|  | Medium | Location 3 |

[Table 7] shows an example of mapping of the ranges that communication range values respectively for message types show and areas to which the range values are applied.

TABLE 7

Example-6 of Communication Range
Values respectively for Message Types

| Message type (e.g. PSID or ITS-AID) | Range | Location |
|---|---|---|
| PSID 1 | 50 m | Location 1 |
|  | 400 m | Location 2 |
|  | 400 m | Location 3 |

The SE layer 220 may store and manage one or more of the mapping method shown in [Table 5], the mapping method shown in [Table 6], and the mapping method shown in [Table 7]. 'Location' may be a unit that may show location information (e.g., latitude/longitude, Cell information (Cell Id, a list of Cell Ids), Registration Area, a list of Registration Area, PLMN ID, and a list of PLMN IDs).

The SE layer 220 may determine a communication range value using the mapping information in [Table 5], [Table 6], or [Table 7] in accordance with the current location of the UE 210 and the message type received from the application layer 215. For example, when the message type received from the application layer 215 is PSID 1 and a UE is at 'Location 1', the SE layer 220 may configure a communication range value as 1 using [Table 5]. Alternatively, he SE layer 220 may change the communication range value to 'Short' using [Table 6] and configure, as 1, the communication range value corresponding to 'Short' using [Table 1]. Alternatively, the SE layer 220 may change the communication range value to 50 m using [Table 7] and configure, as 1, the communication range value corresponding to 50 m using [Table 1]. For example, when the message type received from the application layer 215 is PSID 1 and a UE is at 'Location 2', the SE layer 220 may configure a communication range value as 2 using [Table 5]. Alternatively, the SE layer 220 may change the communication range value to 'Medium' using [Table 6] and configure, as 2, the communication range value corresponding to 'Medium' using [Table 1]. Alternatively, the SE layer 220 may change the communication range value to 400 m using [Table 7] and configure, as 2, the communication range value corresponding to 400 m using [Table 2].

The SE layer 220 may transmit a message and a message type received from the application layer 215 and a communication range value configured by the SE layer (e.g., when a PSID 1 message is received and a UE is at 'Location 1', 1 is set, and when UE is at 'Location 2', 2 is set) to the AS layer 225.

The SE layer 220 according to an embodiment of the disclosure may use the configured information in [Table 2], [Table 3], or [Table 4] to determine the communication range of a message received from the application layer 215. If there is no value corresponding to a message and a message type received from the application layer 215 in [Table 2], [Table 3], or [Table 4], the SE layer 220 may use the communication range value corresponding to 'Matching all'. For example, when the message type of a message received from the application layer 215 is PSID 3, the SE layer 220 may configure a communication range value corresponding to 'Matching all' as 1. The SE layer 220 may deliver a message and a message type received from the application layer 215 and a communication range value configured by the SE layer to the AS layer 225.

The SE layer 220 according to an embodiment of the disclosure may use the configured information in [Table 5], [Table 6], or [Table 7] to determine the communication range of a message received from the application layer 215. If there is no communication range value corresponding to the message type of a message corresponding to the current location of the UE 210 and received from the application layer 215 in [Table 5], [Table 6], or [Table 7], the SE layer 220 may use the communication range value corresponding to 'Matching all'. For example, when the current location of the UE 210 is 'Location 4' and the message type of a message received from the application layer 215 is PSID 1, the SE layer 220 may configure a communication range value corresponding to 'Matching all' as 1. The SE layer 220 may deliver a message and a message type received from the application layer 215 and a communication range value configured by the SE layer to the AS layer 225.

The UEs 210 and 240 may use various Radio Access Technologies (RAT) to transmit and receive messages. For example, LTE RAT, NR RAT, and WiFi technologies may be exemplified as the RAT.

The SE layer 220 may select the RAT type for transmitting the message received from the application layer 215. The SE layer 220 may determine whether to transmit a communication range value with the message to the AS layer 225, depending on an RAT type selected, based on a pre-configured configuration or local policy. For example, the SE layer 220 may determine to transmit the message received from the application layer 215 using NR RAT and may transmit the message, the message type, and the communication range value configured by the SE layer to the AS layer 225. Alternatively, the SE layer 220 may determine to transmit the message received from the application layer 215 using LTE RAT and may transmit only the message and the message type to the AS layer 225 except for the communication range value configured by the SE layer. Alternatively, the SE layer 220 may determine to transmit the message received from the application layer 215 using WiFi RAT and may transmit only the message and the message type to the AS layer 225 except for the communication range value configured by the SE layer. These are examples for describing an embodiment of the disclosure and whether to deliver a communication range value for each RAT type to the AS layer 225 may depend on the policy of a UE.

The AS layer 225 obtaining the message, the message type, and the communication range value (e.g., 1, 2, and 3) from the SE layer 220 may transmit the message through the PHY layer 230 by adjusting the intensity of power for transmitting the message in accordance with the communication range value. According to an embodiment of the disclosure, the AS layer 225 may transmit messages with different levels of power, depending on the messages. For example, when transmitting a message with a communication range value of 3, the AS layer 225 may transmit the message with maximum output. For example, when transmitting a message with a communication range value of 1, the AS layer 225 may transmit the message with low output. The message transmitted through the PHY layer 230 may be transmitted to the PHY layer 260, the AS layer 255, and the SE layer 250 of the surrounding UE 240 to the application layer 245.

The UEs 110 and 120 according to an embodiment of the disclosure may obtain the configured information shown in [Table 1], [Table 2], [Table 3], [Table 4], [Table 5], [Table 6], and [Table 7] and information about the policy about whether to transmit communication range values for respective RAT types (e.g., LTE RAT, NR RAT, and WiFi) to the AS layer from the telecommunication system 130.

Figure 3:
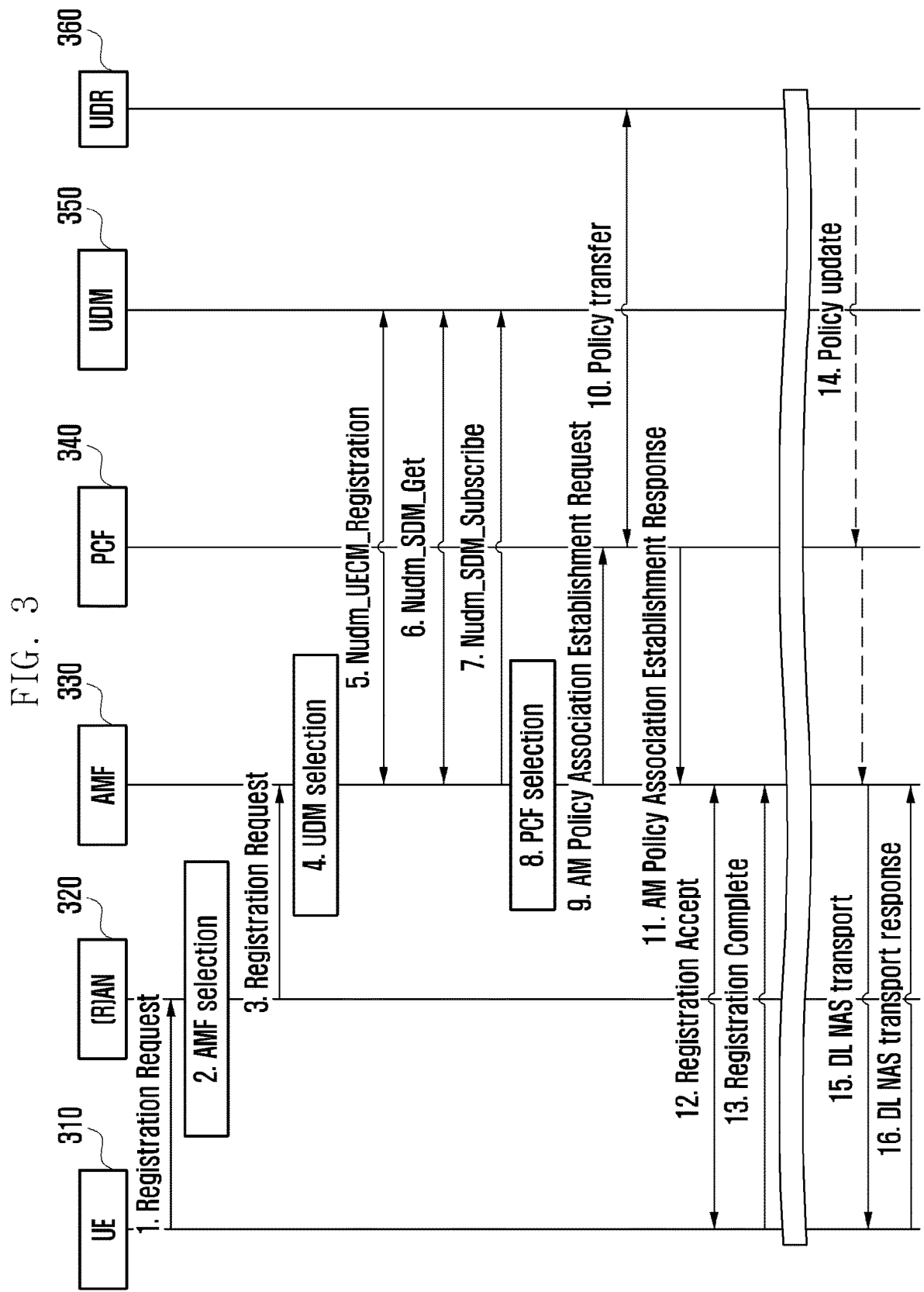
FIG. 3 shows a network-based terminal provisioning procedure according to an embodiment of the disclosure.

FIG. 3 shows a 5G network registration procedure of a vehicle UE according to an embodiment of the disclosure.

Referring to FIG. 3, a vehicle UE 310 according to an embodiment of the disclosure may transmit a registration request message (Step 1). The vehicle UE 310 may include capability (e.g., V2X capability) information of the UE 310 in the registration request message. A base station 320 receiving the registration request message may select an access and mobility management function (AMF) to receive the registration request message (Step 2). The base station 320 may transmit the registration request message received from the UE 310 to the AMF 330 (Step 3). The AMF 330 receiving the registration request message may select a unified data management (UDM) (Step 4). The AMF 330 may obtain subscription information of the UE 310 from the selected UDM 350 (Step 5 and Step 6). The AMF 330 may apply event subscription to the selected UDM 350 (Step 7). The AMF 330 may select a PCF (Step 8). When selecting the policy control function (PCF) 340, the AMF 330 may use capability information included in the registration request message and transmitted by the UE 310. For example, when the UE 310 has transmitted V2X capability, the AMF 330 may select the PCF 340 that supports a V2X function. The AMF 330 may perform policy association establishment with the selected PCF 340 (Step 9 and Step 11). The AMF 330 may request V2X policy information of the UE 310 from the PCF 340. The PCF 340 may take the V2X policy information of the UE 310 stored in a unified data repository (UDR) 360 from the UDR 360 (Step 10). The PCF 340 may provide the V2X policy information obtained from the UDR 360 to the AMF 330 (Step 11). If the V2X policy information of the UE 310 has been stored already in the PCF 340, Step 10 may be omitted. As the V2X policy information stored in the UDR 360 or the PCF 340, the information shown in at least one of [Table 1], [Table 2], [Table 3], [Table 4], [Table 5], [Table 6], or [Table 7] may be included. Further, as the V2X policy information, a policy about whether to transmit communication range values respectively for RAT types (e.g., LTE RAT, NR RAT, and WiFi) to the AS layer may be included. The AMF 330 may return a registration response message for the registration request message received in Step 3 to the UE 310 (Step 12). The V2X policy information that the AMF 330 returns from the PCF 340 may be included in the registration request message and transmitted to the UE 310. The UE 310 may store therein and use the received V2X policy information.

The AMF 330 may transmit the V2X policy information anytime to the UE 310 that has finished the registration procedure (Step 15 and Step 16). The V2X policy information may be included in a DL NAS transport message that the AMF 330 transmits to the UE 310 (Step 15). As a method for the AMF 330 to determine whether to transmit the V2X policy information to the UE 310, it is possible to perform Step 15 when the available period of V2X policy information that the AMF 330 transmitted before is expired. Alternatively, The AMF 330 may perform Step 15 when the version of the V2X policy information that the AMF 330 transmitted before is expired. Alternatively, The AMF 330 may perform Step 15 when there is V2X policy information that may be applied to the current location (registration area) of the UE 310. Alternatively, The AMF 330 may perform Step 15 when the AMF 330 receives updated V2X policy information from the PCF 340 (Step 14). The PCF 340 may receive notification of update of V2X policy information from the UDR 360 and may transmit the updated V2X information to the PCF 340 (Step 14).

The UEs 310 and 410 that have finished the registration procedure may request V2X policy information anytime.

Figure 4:
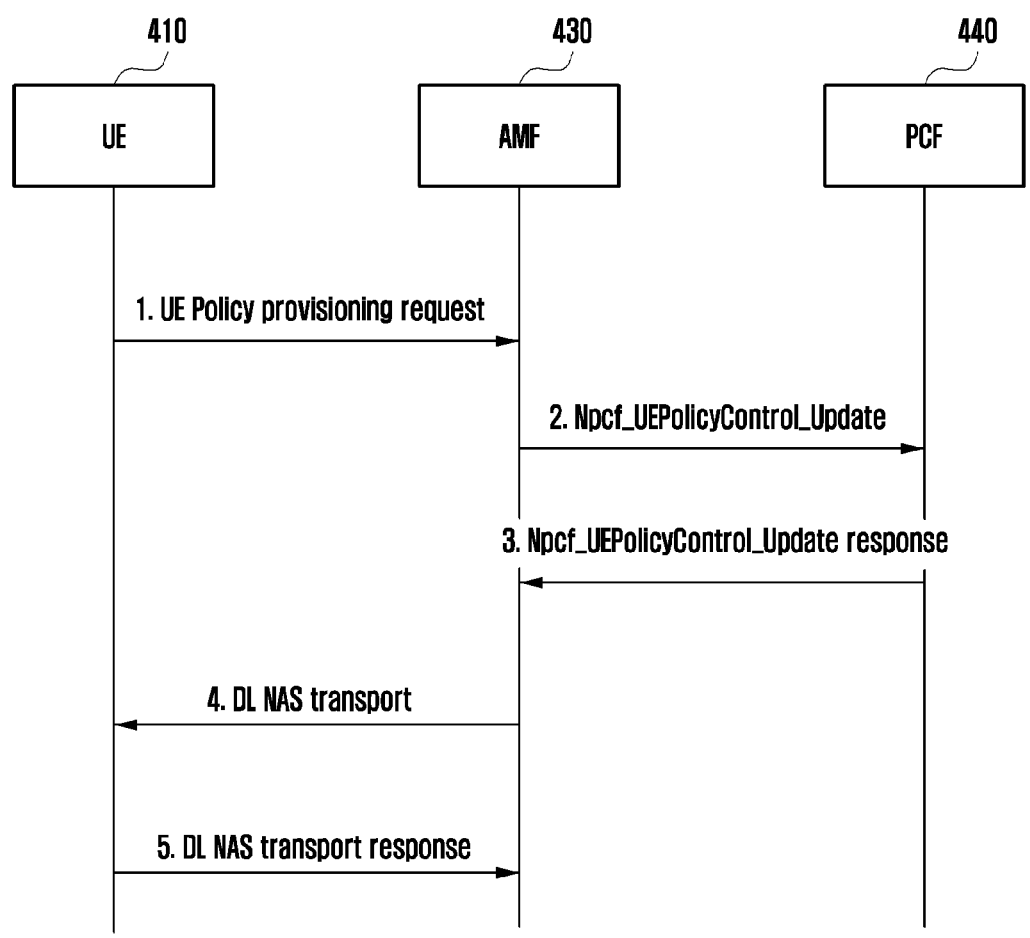
FIG. 4 shows a terminal-based terminal provisioning procedure according to an embodiment of the disclosure.

FIG. 4 shows a procedure of requesting policy information of a UE according to an embodiment of the disclosure.

The UE 410 that has finished the process from Step 1 to Step 12 shown in FIG. 3 may request V2X policy information through the procedure shown in FIG. 4. The UE 410 may transmit a UE policy provisioning request message to an AMF 430 (Step 1). The kind of policy information requested by the UE 410 (e.g., a V2X policy) may be included in the UE policy provisioning request message. The AMF 430 may request the PCF 440 to update policy information (Step 2). The PCF 440 may return a policy information update response message including policy information to the AMF 430 (Step 3). V2X policy information of the UE 410 may be included in the policy information included in the policy information update response message that the PCF 440 receives. The AMF 430 may transmit a DL NAS transport message to the UE 410 (Step 4). The V2X policy information received from the PCF 440 may be included in the DL NAS transport message. The UE 410 may store therein and use the received V2X policy information.

There may be various methods (conditions under which Step 1 shown in FIG. 4 is started) for the UE 410 to determine to request V2X policy information from the AMF 430. For example, it is possible to perform Step 1 shown in FIG. 4 when the available period of V2X policy information that the UE 410 received before and keeps is expired. Alternatively, it is possible to perform Step 1 shown in FIG. 4 when version of V2X policy information that the UE 410 received before and keeps is expired. Alternatively, it is possible to perform Step 1 shown in FIG. 4 when there is no V2X policy information that may be applied to the current location (registration area) of the UE 410. For example, if there is no communication range value corresponding to the message type of a message corresponding to the current location of the UE 410 and received from the application layer 215 in [Table 5, [Table 6], or [Table 7] while the SE layer 220 of the UE 410 processes the message received from the application layer 215, the UE 410 may determine that there is no V2X policy information that may be applied to the current location and may perform Step 1 shown in FIG. 4 to obtain the newest V2X policy information.

Figure 5:
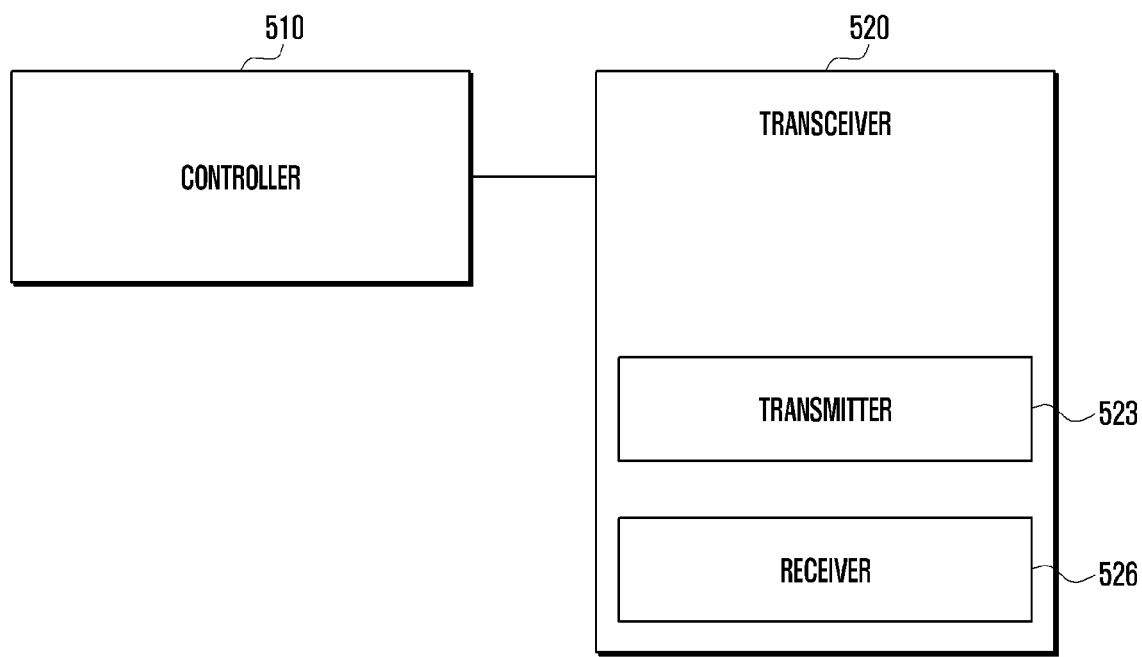
FIG. 5 is a diagram showing the configuration of a terminal according to an embodiment of the disclosure.

FIG. 5 is a diagram showing the configuration of a terminal according to an embodiment of the disclosure. However, this is only one embodiment, and the configuration of the transceiver 520 is not limited to the contents shown in FIG. 5.

A UE according an embodiment of the disclosure may include a transceiver 520 and a controller 510 that controls the general operation of the UE. The transceiver 520 may include a receiver 523 and a transmitter 526.

The transceiver 520 may transmit/receive signals to/from other network entities. For example, the UE may transmit a registration request message to the base station through the transceiver 520. In addition, the UE may transmit a policy information request message to the AMF through the transceiver 520.

The controller 510 may control the UE to perform any one operation of the embodiments described above. Meanwhile, it should be noted that the controller 510 and the transceiver 520 are not necessarily implemented as separate modules and may be implemented as one component such as single chip. The controller 510 and the transceiver 520 may be electrically connected. For example, the controller 510 may be a circuit, an application-specific circuit, or at least one processor. The operations of the UE may be achieved by providing a memory device storing corresponding program codes to any component in the UE.

Figure 6:
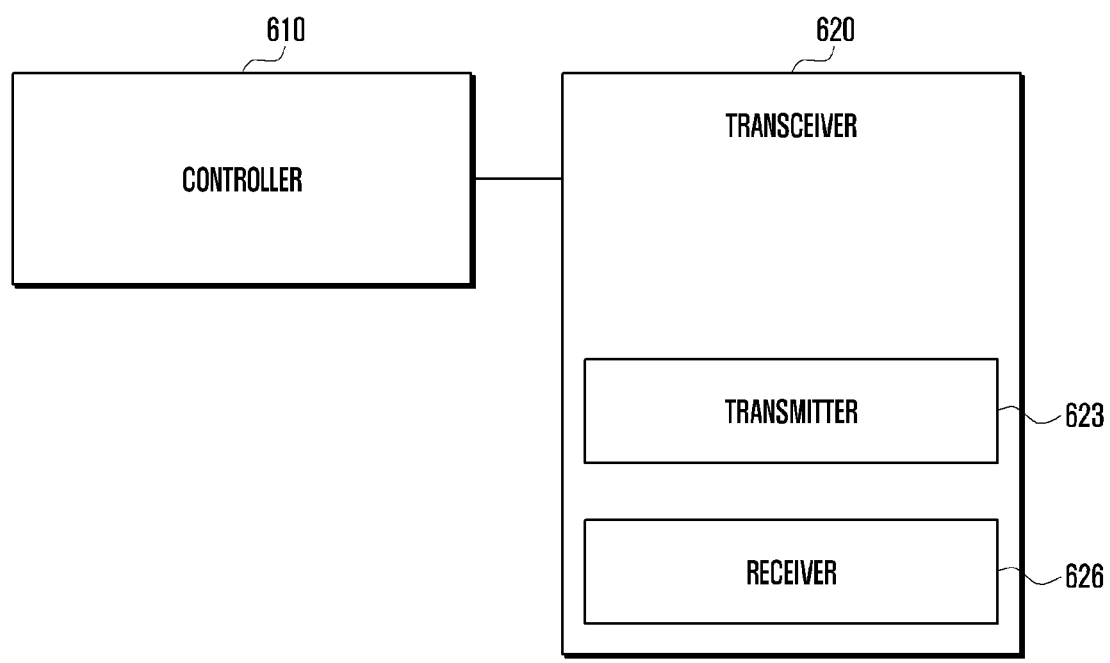
FIG. 6 is a diagram showing the configuration of a network entity according to an embodiment of the disclosure.

FIG. 6 is a diagram showing the configuration of a network entity according to an embodiment of the disclosure.

A network entity according an embodiment of the disclosure may include a transceiver 620 and a controller 610 that controls the general operation of the network entity. The transceiver 620 may include a receiver 623 and a transmitter 626. However, this is only one embodiment, and the configuration of the transceiver 620 is not limited to the contents shown in FIG. 6.

The transceiver 620 may transmit/receive signals to/from other network entities.

The controller 610 may control the network entity to perform any one operation of the embodiments described above. Meanwhile, it should be noted that the controller 610 and the transceiver 620 are not necessarily implemented as separate modules and may be implemented as one component such as single chip. The controller 610 and the transceiver 620 may be electrically connected. For example, the controller 610 may be a circuit, an application-specific circuit, or at least one processor. The operations of the network entity may be achieved by providing a memory device storing corresponding program codes to any component in the network entity.

The network entity may be a base station, AMF, PCF, UDM, or UDR.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal supporting a vehicle to everything (V2X) communication in a mobile communication system, the method comprising:
   receiving, from an access and mobility management function (AMF), policy information for the V2X communication;
   delivering, by a V2X application layer to a V2X layer, a V2X message, first information on a service type of the V2X message, and second information on a range requirement for the service type of the V2X message;
   identifying, by the V2X layer, whether the policy information supports the range requirement; and
   in case that the policy information does not support the range requirement, determining, by the V2X layer, range information for the service type of the V2X message based on mapping information of the service type of the V2X message to the range information, the mapping information being included in the policy information.

2. The method of claim 1, further comprising in case that the policy information supports the range requirement, determining, by the V2X layer, the range information based on the range requirement.

3. The method of claim 1, further comprising delivering, by the V2X layer, the determined range information to an access stratum (AS) layer.

4. The method of claim 3, wherein the determined range information is delivered to the AS layer, in case that a radio access technology (RAT) type for transmission of the V2X message is determined to a new radio (NR) RAT.

5. The method of claim 1, further comprising:
   determining the policy information for the V2X communication is invalid, in case that a validity timer in the policy information expires;
   transmitting, to the AMF, a message for request policy information for the V2X communication; and
   receiving, from the AMF, policy information for the V2X communication as a response to the message.

6. The method of claim 1, further comprising transmitting, by a physical (PHY) layer, the V2X message based on the range information.

7. The method of claim 1, wherein the first information on the service type of the V2X message includes a provider service identifier (PSID) or an intelligent transport systems-application identifier (ITS-AID).

8. A terminal supporting a vehicle to everything (V2X) communication, in a mobile communication system, the terminal comprising:
   a transceiver; and
   a controller configured to:
      receive, from an access and mobility management function (AMF), policy information for the V2X communication,
      deliver, by a V2X application layer to a V2X layer, a V2X message, first information on a service type of the V2X message, and second information on a range requirement for the service type of the V2X message,
      identify, by the V2X layer, whether the policy information supports the range requirement, and
      in case that the policy information does not support the range requirement, determine, by the V2X layer, range information for the service type of the V2X message based on mapping information of the service type of the V2X message to the range information, the mapping information being included in the policy information.

9. The terminal of claim 8, wherein the controller is further configured to in case that the policy information supports the range requirement, determine, by the V2X layer, the range information based on the range requirement.

10. The terminal of claim 8, wherein the controller is further configured to deliver, by the V2X layer, the determined range information to an access stratum (AS) layer.

11. The terminal of claim 10, wherein the determined range information is delivered to the AS layer, in case that a radio access technology (RAT) type for transmission of the V2X message is determined to a new radio (NR) RAT.

12. The terminal of claim 8, wherein the controller is further configured to:
   determine the policy information for the V2X communication is invalid, in case that a validity timer in the policy information expires,
   transmit, to the AMF, a message for request policy information for the V2X communication, and
   receive, from the AMF, policy information for the V2X communication as a response to the message.

13. The terminal of claim 8, wherein the controller is further configured to transmit, by a physical (PHY) layer, the V2X message based on the range information.

14. The terminal of claim 8, wherein the first information on the service type of the V2X message includes a provider service identifier (PSID) or an intelligent transport systems-application identifier (ITS-AID).

* * * * *